(12) United States Patent
Hamada

(10) Patent No.: US 10,783,930 B2
(45) Date of Patent: Sep. 22, 2020

(54) DISPLAY CONTROL DEVICE, DISPLAY CONTROL METHOD, AND COMPUTER PROGRAM PRODUCT

(71) Applicant: KABUSHIKI KAISHA TOSHIBA, Minato-ku, Tokyo (JP)

(72) Inventor: Shinichiro Hamada, Fuchu Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 137 days.

(21) Appl. No.: 15/414,748

(22) Filed: Jan. 25, 2017

(65) Prior Publication Data

US 2017/0243616 A1 Aug. 24, 2017

(30) Foreign Application Priority Data

Feb. 24, 2016 (JP) ................... 2016-033451

(51) Int. Cl.
| | | |
|---|---|---|
| *G11B 27/34* | (2006.01) | |
| *G11B 27/28* | (2006.01) | |
| *G11B 27/10* | (2006.01) | |
| *G11B 27/00* | (2006.01) | |
| *G09G 5/02* | (2006.01) | |
| *G09G 5/14* | (2006.01) | |
| *H04N 21/472* | (2011.01) | |
| *H04N 21/482* | (2011.01) | |

(Continued)

(52) U.S. Cl.
CPC ............ *G11B 27/34* (2013.01); *G09G 5/02* (2013.01); *G09G 5/14* (2013.01); *G11B 27/005* (2013.01); *G11B 27/102* (2013.01); *G11B 27/105* (2013.01); *G11B 27/28* (2013.01); *G06F 3/0485* (2013.01); *G06F 3/0486* (2013.01); *G06F 2203/04806* (2013.01); *H04N 21/47217* (2013.01); *H04N 21/4828* (2013.01)

(58) Field of Classification Search
None
See application file for complete search history.

(56) References Cited

U.S. PATENT DOCUMENTS

| 8,744,244 B2 * | 6/2014 | Takahashi ............ G11B 27/005 386/285 |
| 2005/0108253 A1 | 5/2005 | Metsatahti et al. |
| 2007/0047917 A1 | 3/2007 | Sasaki et al. |

(Continued)

FOREIGN PATENT DOCUMENTS

| JP | 2005-202944 | 7/2005 |
| JP | 2008-061704 | 3/2008 |

(Continued)

*Primary Examiner* — Heather R Jones
(74) *Attorney, Agent, or Firm* — Amin, Turocy & Watson, LLP

(57) ABSTRACT

A display control device includes an assigning unit and a display control unit. The assigning unit assigns, with respect to S number of units of display (where S is an integer equal to or greater than two) included in a display area in which units of display having the width equal to L number of pixels (where L is an integer equal to or greater than one) are placed in the width direction, M number of sets of data (where M is an integer greater than S) in a divided manner. The display control unit controls display of the units of display in different display formats according to the number of sets of data of a particular type included in the assigned data.

11 Claims, 14 Drawing Sheets

(51) Int. Cl.
　　　*G06F 3/0485*　　　(2013.01)
　　　*G06F 3/0486*　　　(2013.01)

(56) References Cited

U.S. PATENT DOCUMENTS

2008/0016089 A1*　1/2008　Nishiyama ........... G11B 27/034
2008/0039692 A1　　2/2008　Hirakawa
2017/0013289 A1*　1/2017　Nightingale ..... H04N 21/23113

FOREIGN PATENT DOCUMENTS

| JP | 4871550 | 2/2012 |
| JP | 2013-105502 | 5/2013 |
| JP | 2015-200956 | 11/2015 |

* cited by examiner

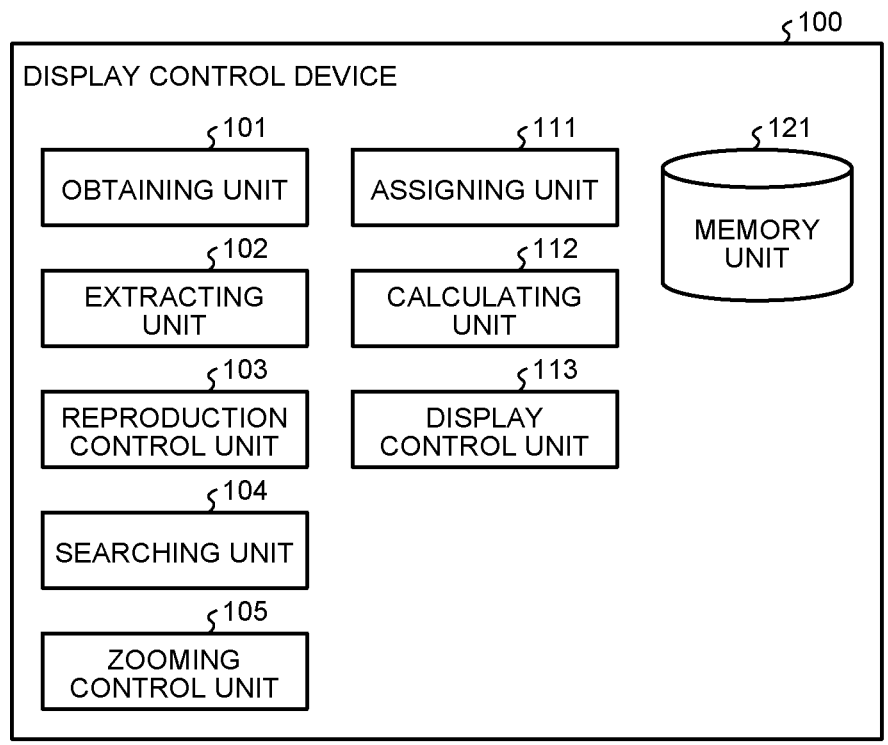

FIG.3

| DENSITY CONDITION | COLOR |
|---|---|
| d=0 | RGB (0, 0, 0) |
| 0<d<1 | RGB (128, 0, 0) |
| d=1 | RGB (255, 0, 0) |

FIG.4

| DENSITY CONDITION | COLOR |
|---|---|
| d=0 | RGB (0, 0, 0) |
| 0<d≤0.25 | RGB (100, 0, 0) |
| 0.25<d≤0.5 | RGB (120, 0, 0) |
| 0.5<d≤0.75 | RGB (140, 0, 0) |
| 0.75<d<1 | RGB (160, 0, 0) |
| d=1 | RGB (255, 0, 0) |

FIG.7

| SLICE | 0..9 | 10..19 | 20..29 |
|---|---|---|---|
| VIDEO | 0 | 1 | 2 |

FIG.8

| SLICE | 0 | 1 | 2 |
|---|---|---|---|
| VIDEO | 0..9 | 10..19 | 20..29 |

FIG.9

| SLICE | 0..9 | 10..19 | 20..29 |
|---|---|---|---|
| VIDEO | 2 | 3 | 4 |

FIG.10

| SLICE | 0 | 1 | 2 |
|---|---|---|---|
| VIDEO | 20..29 | 30..39 | 40..49 |

FIG.18
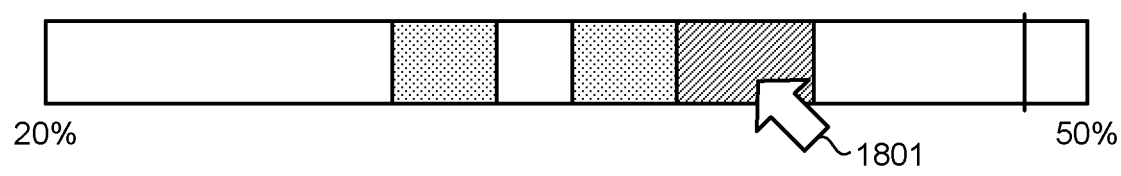
20%  1801  50%
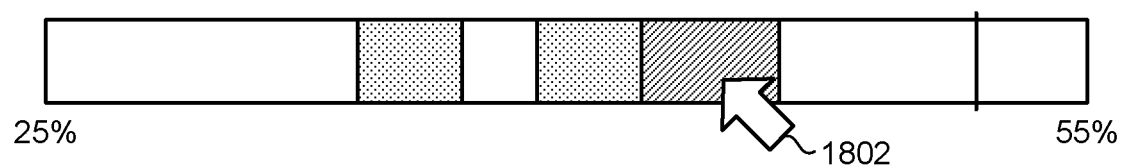
25%  1802  55%

US 10,783,930 B2

DISPLAY CONTROL DEVICE, DISPLAY CONTROL METHOD, AND COMPUTER PROGRAM PRODUCT

CROSS-REFERENCE TO RELATED APPLICATIONS

This application is based upon and claims the benefit of priority from Japanese Patent Application No. 2016-033451, filed on Feb. 24, 2016; the entire contents of which are incorporated herein by reference.

FIELD

An embodiment described herein relates generally to a display control device, a display control method, and a computer program product.

BACKGROUND

A lot of digital video reproducing devices include a seek bar that enables easy cueing of arbitrary timing positions. The seek bar includes a bar representing the sequence of an entire video and includes a pointer (cursor) representing the position that is being currently reproduced. When a user performs an operation of moving the position of the pointer, the timing position to be reproduced gets changed.

Moreover, with the aim of enabling the user to have an overhead view of the configuration or the distribution of the video contents and with the aim of making it easier to either view or skip only particular sections, a seek bar is known that has the function of creating a visualization in which the particular sections are distinguishable from the other sections.

BRIEF DESCRIPTION OF THE DRAWINGS

FIG. 1 is a block diagram illustrating an exemplary configuration of a display control device according to an embodiment;

FIG. 2 is a diagram illustrating exemplary data structures of a coloration table;

FIG. 3 is a diagram illustrating exemplary data structures of a coloration table;

FIG. 4 is a diagram illustrating exemplary data structures of a coloration table;

FIG. 7 is a diagram illustrating specific examples of assigned video sections;

FIG. 8 is a diagram illustrating specific examples of assigned video sections;

FIG. 9 is a diagram illustrating specific examples of assigned video sections;

FIG. 10 is a diagram illustrating specific examples of assigned video sections;

FIG. 18 is a diagram for explaining a manual scrolling function;

DETAILED DESCRIPTION

Figure 5:
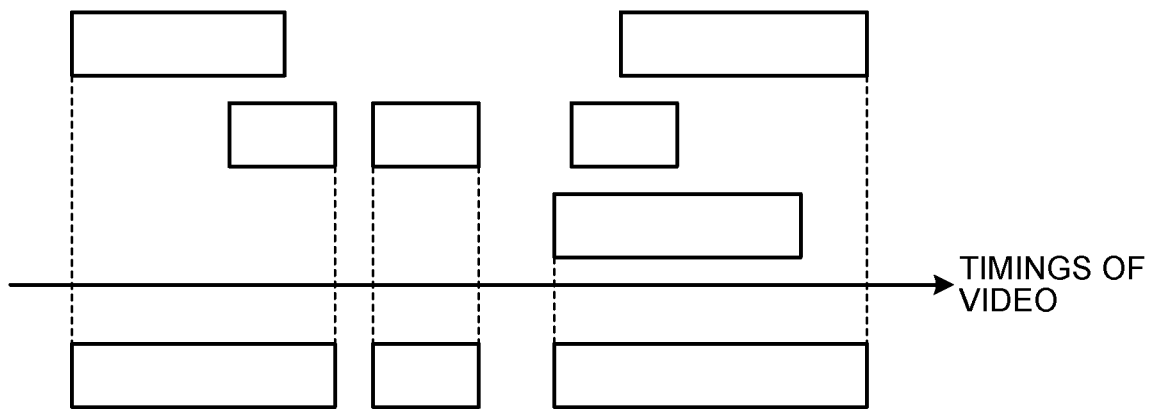
FIG. 5 is a diagram for explaining a method for extracting sections of interest.

In the conventional technology, there are times when particular sections cannot be appropriately visualized in a distinguishable manner from the other sections. For example, extremely minute sections such as frames cannot be directly expressed because they exceed the screen resolution limit. For example, consider a case in which a video made of about one hundred thousand frames (a video of about 60 minutes at 30 frames per second (fps)) is to be displayed with a bar having the length equal to 1000 pixels. In that case, if the video includes ten thousand particular sections that need to be distinguished, then displaying the particular sections in a distinguishable manner from the other sections is an impossible task in principle.

A display control device according to an embodiment includes an assigning unit and a display control unit. The assigning unit assigns, with respect to S number of units of display (where S is an integer equal to or greater than two) included in a display area in which the units of display having the width equal to L number of pixels (where L is an integer equal to or greater than one) are placed in the width direction, M number of sets of data (where M is an integer greater than S) in a split manner. The display control unit controls display of the units of display in different display formats according to the number of sets of data of a particular type included in the assigned data.

An exemplary embodiment of the display control device according to the invention is described in detail below with reference to the accompanying drawings.

In the following explanation, a seek bar having the function of visualizing particular sections in a distinguishable manner from the other sections is called a section-displaying seek bar. Herein, particular sections (in the following explanation, sometimes called sections of interest) contain data of a particular type such as a goal scene or a commercial message. Examples of the method for distinguishing particular sections include coloring the particular sections with a different color than the other sections. Such a seek bar provides binary information about whether or not a section is a section of interest.

There is another method in which a video is classified into a plurality of types such as headline news, sports news, economic news, and commercial messages; and label texts or coloring is used to have distinction among the classification results. Such a section-displaying seek bar provides multivalued information enabling identification of the type of each section. In the following explanation, in order to distinguish between a section-displaying seek bar providing binary information and a section-displaying seek bar providing multivalued information, the former type of seek bar is called a binary section-displaying seek bar and the latter type of seek bar is called a multivalued section-displaying seek bar.

A section-displaying seek bar is believed to be effective in, for example, supporting the task of finding requisite sections that serve as the material during video editing. In such an application, it is required that the range of sections can be confirmed at a fine accuracy such as in frames. Meanwhile, there are times when extremely small sections having the length of only a few frames are present or when there is a mix of sections having a large difference in size ranging from extremely small sections to large sections. In such cases too, it is required that the display enables the user to understand the range of each section with ease and accuracy.

However, as described above, extremely minute sections such as frames cannot be appropriately expressed because they exceed the screen resolution limit. In that regard, in the display control device according to the embodiment, even with respect to a video including a group of minute sections that exceed the limit of displayable resolution, the range of each section is made identifiable in an intuitive and simple manner.

In the display control device according to the embodiment, in a seek bar having the function of creating a visualization of particular sections in a distinguishable manner from the other sections in a video sequence, functions (F1) and (F2) explained later are added. Herein, the following terms are used.

Slice: when the seek bar has the display size equal to (dots over a height H)×(dots over a width W), each sub-display area constituting the display area of the seek bar and having the size equal to (dots over the height H)×(dots over a width 1) is called a slice.

Unit video: a video having the length of the smallest unit for deciding the start position and the end position of each section of interest is called a unit video. Examples of unit videos include frame-by-frame videos or millimeter-by-millimeter videos.

Displayed video: a video displayed on the display area of the seek bar is called a displayed video. Normally, the entire video sequence represents the displayed video. When a zoom-in display is instructed, sub-sections of the video can represent the displayed video.

Meanwhile, a slice need not have the width of a single dot, and can be L-dot wide (where L is an integer equal to or greater than one). For example, when it is difficult to visually confirm a 1-dot slice, the width (L) thereof can be set to a value such as two or three that is greater than one. If L is overly large, then there are times when the configuration and the distribution of video contents cannot be appropriately understood. Thus, the value L can be set to an appropriate value by taking into consideration the visibility.

A slice is equivalent to the unit of display having L number of pixels (where L is an integer equal to or greater than one). The display area of a seek bar is equivalent to the display area in which S number of slices (where S is an integer equal to or greater than two) are placed in the width direction. When L=1 holds true, S=W/L=W holds true. That is, the display area of the seek bar includes W number of slices.

(F1) Color Coding of Slices

When a video is provided in which the number of unit video groups exceeds the number of slices included in the seek bar, unit video groups are dynamically assigned to each slice.

Based on the unit video groups assigned to each slice, the slices are classified into the following three categories:
C1: when all assigned unit video groups belong to sections of interest (full cover)
C2: when all assigned unit video groups do not belong to sections of interest (no cover)
C3: other than C1 and C2 (partial cover)
Each slice is color-coded so as to make the three categories viewable in a distinguishably manner.

(F2) Zoom-In Display

With respect to the seek bar displayed as a result of implementing the function F1 or with respect to the seek bar displayed as a result of implementing the function F2 (note: recursive definition) following the function F1, when a predetermined user operation is performed, the sub-sections of the video are reassigned as displayed videos based on the user operation.

An operation identical to the function F1 is performed with respect to the videos in the sub-sections.

Meanwhile, the applicable data is not limited to a video (or a sequence of continuous images), and it is alternatively possible to use a series of an arbitrary M number of sets of data. For example, the application can also be done for the display of data such as the DNA arrangement (DNA stands for DeoxyriboNucleic Acid), musical notes, speech waveforms, a sequence of signals output from a sensor (sensor data), and texts. Moreover, the application can be done for the difference-section display in a text difference display tool that displays the difference among a plurality of texts. Particularly, in the case of a data series such as the DNA arrangement or sensor data containing an enormous number of data elements, the section display based on zooming and densities is effective in reducing the time and effort for finding desired sections.

The embodiment is effective in the case of displaying, in S number of slices, data exceeding the limit of the resolution (the maximum pixel count) of the display area, that is, displaying the M number of sets of data greater in number than the S number of slices. Meanwhile, even in the case in which the M number of sets of data to be displayed becomes equal to or smaller than the S number of slices due to a function such as the function F2, it becomes possible to appropriately assign data to each slice and display the data.

The following explanation is mainly given for an example in which the functions (F1) and (F2) are added to a binary section-displaying seek bar. Regarding the method of application to a multivalued section-displaying seek bar, the explanation is given later.

FIG. 1 is a block diagram illustrating an exemplary configuration of a display control device 100 according to the embodiment. As illustrated in FIG. 1, the display control device 100 includes an obtaining unit 101, an extracting unit 102, a reproduction control unit 103, a searching unit 104, a zooming control unit 105, an assigning unit 111, a calculating unit 112, a display control unit 113, and a memory unit 121.

The memory unit 121 is used to store a variety of data used in various operations performed in the display control device 100. For example, the memory unit 121 is used to store the information (such as a coloration table) that is referred to by the display control unit 113 at the time of deciding the display colors of the slices. FIGS. 2 to 4 are diagrams illustrating exemplary data structures of the coloration table. In FIGS. 2 to 4 are illustrated examples of coloration tables in the case of performing color-coding in two colors, three colors, and six colors, respectively. As illustrated in FIGS. 2 to 4, the coloration table has a data structure in which density conditions are held in a corresponding manner to colors. A color corresponding to a density that conforms to a particular density condition is decided as the color of the slices having that particular density. Meanwhile, regarding the density and the coloration table, the details are given later.

The memory unit 121 can be configured using any commonly used memory medium such as a hard disk drive (HDD), an optical disk, a memory card, or a random access memory (RAM).

Returning to the explanation with reference to FIG. 1, the obtaining unit 101 obtains videos. For example, the obtaining unit 101 obtains a video, which is to be reproduced, from an external device connected to a network such as the Internet. The obtained video can be stored in the memory unit 121. However, the method by which the obtaining unit 101 obtains a video is not limited to this example, and any other method can be implemented. For example, the obtaining unit 101 can be configured to obtain a video recorded in a recording medium such as a digital versatile disk (DVD).

The extracting unit 102 extracts sections of interest from the obtained video. For example, from the video obtained from the obtaining unit 101, the extracting unit 102 extracts a group of unit videos that are of interest from a predetermined point of view, and outputs the group as sections-of-interest information. The extraction algorithm differs according to the application. Herein, as an example, a method is explained in which the sections-of-interest information is generated by performing face detection with respect to a video. FIG. 5 is a diagram for explaining a method for extracting the sections of interest.

Firstly, the extracting unit 102 performs a face detection operation with respect to the entire video. Thus, the extracting unit 102 extracts one or more faces and extracts section information of the video for indicating the sections in which the faces are detected. In FIG. 5, rectangles that are illustrated above the temporal axis of the video as illustrated by an arrow represent the sections in which the faces are detected. Then, as the section of interest, the extracting unit 102 extracts the sum set of the concerned sections, that is, extracts the section formed by integrating a plurality of sections having overlapping portions. Subsequently, the extracting unit 102 outputs information indicating the extracted section of interest (i.e., outputs sections-of-interest information).

The sections-of-interest information can be any type of information as long as it enables identification of the sections of interest. For example, the sections-of-interest information is binary information enabling distinction between a sections-of-interest group and the other sections. Alternatively, the sections-of-interest information can be information indicating the start timing and the end timing of the sections of interest. As a result of using the sections-of-interest information, only such sections in the video in which the faces of people are appearing can be displayed in a distinguishable manner from the other sections.

Meanwhile, if the sections of interest have been extracted in advance, then the extracting unit 102 may be omitted from the configuration. In that case, the operations described later can be performed using the sections-of-interest information extracted in advance.

Returning to the explanation with reference to FIG. 1, the reproduction control unit 103 provides the function of reproducing the obtained video. For example, in response to an operation performed using a play button, a stop button, a pause button, a fast-forward button, or and rewind button; the reproduction control unit 103 provides the function of reproducing the video, stopping the video, pausing the video, fast-forwarding the video, or rewinding the video, respectively.

The searching unit 104 searches for the reproduction position specified, for example, by the user. For example, the searching unit 104 receives a seek operation performed by the user, and issues an instruction to the display control unit 113 to change the current reproduction position of the video to the specified reproduction position. Examples of the seek operation include a mouse click on the seek bar. Upon receiving the instruction (seek instruction), the display control unit 113 changes the current position display on the seek bar. Meanwhile, the searching unit 104 sends an identical instruction to the reproduction control unit 103 too. Upon receiving the instruction, the reproduction control unit 103 changes the reproduction position of the video.

The zooming control unit 105 controls, in response to a user instruction to magnify the display, an operation (zooming) to vary the sections of the video to be displayed on the seek bar. For example, the zooming control unit 105 receives a zoom operation performed by the user, and issues an instruction to the display control unit 113 to vary the zooming scale of the seek bar. Upon receiving the instruction, the display control unit 113 redisplays the seek bar at an appropriate zooming scale.

A zoom operation can be any type of operation. For example, the following operations on seek bar are interpreted as zoom operations. Given below are exemplary zoom operations and examples of the type of zooming performed in response to the zoom operations.

[Zoom Operation]: [Zooming]

upward rotation of the scroll wheel: zoom in (to double size)

double click: zoom in (to double size)

downward rotation of the scroll wheel: zoom out (to half size)

shift key+double click: zoom out (to half size)

When such a zoom operation is performed, the zooming control unit 105 generates information (zooming information) as given below, for example.

zooming rate: double or half zooming origin: a position (for example, in the unit of frames) on the seek bar Based on the generated information, the zooming control unit 105 calculates new sections of the displayed video using Equations (1) and (2) given below.

$$\text{newStart} = \text{org} - (\text{org} - \text{oldStart})/\text{zoomRate} \quad (1)$$

$$\text{newEnd} = \text{org} + (\text{oldEnd} - \text{org})/\text{zoomRate} \quad (2)$$

Figure 6:
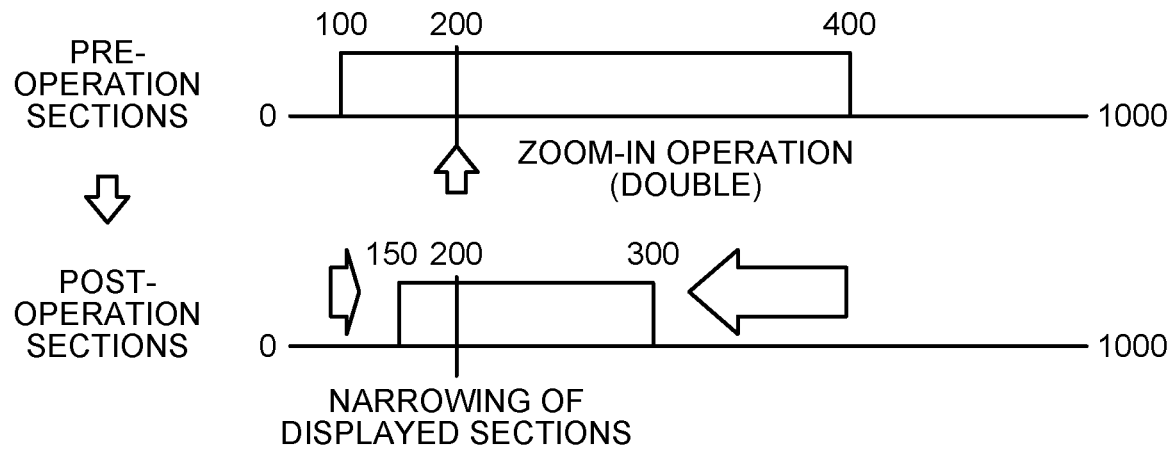
FIG. 6 is a diagram illustrating an exemplary change made in a displayed video based on a zoom operation.

In Equations (1) and (2), the following definitions are used.

oldStart: the pre-operation start position of the displayed video oldEnd: the pre-operation end position of the displayed video newStart: the post-operation start position of the displayed video newEnd: the post-operation end position of the displayed video org: zooming origin zoomRate: zooming rate The zooming control unit 105 sends the values of newStart and newEnd, which are obtained by performing the computations given above, to the display control unit 113. FIG. 6 is a diagram illustrating an exemplary change made in the displayed video based on a zoom operation. Meanwhile, in a zoom out operation, as a result of implementing Equations (1) and (2), if the start position of the displayed video falls below 0% or if the end position of the displayed video exceeds 100%, the zooming control unit 105 can appropriately scroll the entire video in such a way that the sections fit between 0% to 100%.

Returning to the explanation with reference to FIG. 1, the assigning unit 111 assigns, to each slice included in the display area of the seek bar, video sections to be treated as the visualization targets in that slice. For example, the assigning unit 111 divides the M number of sets of data and assigns them to the S number of slices. Herein, dividing the M number of sets of data and assigning them to the S number of slices implies, for example, dividing the M number of sets of data into S number of groups, associating each group to one of the slices, and assigning the data included in each group to the corresponding slice.

When a zoom operation is performed, the assigning unit 111 divides M' number of sets of data into S number of sets of data and assigns the S number of sets of data to the S number of slices. Herein, the M' number of sets of data represents the number of images included in the new sections of the video that have been changed due to a zoom operation. In the case of a zoom-in operation, M' becomes a smaller value than the pre-operation value. In the case of a zoom out operation, M' becomes a greater value than the pre-operation value.

The assigning unit 111 can decide the video section to be assigned to each slice according to, for example, Equations (3) and (4) given below.

$$\text{slice}[x]=\text{movie}[\text{floor}(x\times M/S),\text{floor}(x\times M/S)+1] \quad (3)$$

$$\text{slice}[x]=\text{movie}[\text{floor}(x\times M/S),\text{floor}((x+1)\times M/S)] \quad (4)$$

Herein, the following definitions are used.

S: the number of slices in the seek bar (i.e., the pixel count across the width (length) of the seek bar)

M: the video length (for example, in the unit of frames)

slice[x]: the slice having a slice number x movie[y, z]: the video section having the position equal to or greater than y and smaller than z (for example, the unit of the position is frames)

floor(x): the function returning the maximum integer not exceeding a real number x When the number of slices in the seek bar is greater than or equal to the video length (i.e., when S≥M holds true), a video section (a set of unit videos having frames as the unit, for example) is assigned to each slice according to Equation (3). If that is not the case (i.e., when S<M holds true), a video section is assigned to each slice according to Equation (4).

FIGS. 7 and 8 are diagrams illustrating specific examples of assigned video sections. In the example illustrated in FIG. 7, S=30 and M=3 holds true, and Equation (3) is implemented. In the example illustrated in FIG. 8, S=3 and M=30 holds true, and Equation (4) is implemented.

When the zooming control unit 105 varies the zooming scale of the seek bar so that the entire seek bar displays the sub-sections of the video, the assigning unit 111 decides the video section to be assigned to each slice according to Equations (5) and (6) given below.

$$\text{slice}[x]=\text{movie}[\text{floor}(x\times M'/S)+B,\text{floor}(x\times M'/S)+1)+B] \quad (5)$$

$$\text{slice}[x]=\text{movie}[\text{floor}(x\times M'/S)+B,\text{floor}((x+1)\times M'/S))+B] \quad (6)$$

Herein, the following additional definitions are used.

M': the length of the video displayed by the bar (displayed video)

B: the start position (for example, the unit of the position is frames) of the video displayed by the bar (displayed video)

When the number of slices in the seek bar is greater than or equal to the displayed video length (i.e., when holds true), a video section is assigned to each slice according to Equation (5). If that is not the case (i.e., when S<M' holds true), a video section is assigned to each slice according to Equation (6).

FIGS. 9 and 10 are diagrams illustrating specific examples of assigned video sections. In the example illustrated in FIG. 9; S=30, M'=3, and B=2 holds true, and Equation (5) is implemented. In the example illustrated in FIG. 10; S=3, M'=30, and B=20 holds true, and Equation (6) is implemented.

The assigning unit 111 outputs information indicating the video sections assigned to each slice (i.e., outputs assignment information). In the examples given above, the assignment is done is such a way that the number of video sections is almost equal. However, the assignment method is not limited to that method. Alternatively, the video sections can be assigned by taking into account the number of sections of interest. For example, the number of assigned sections can be adjusted in such a way that the number of sections of interest to be displayed in a single slice does not exceed an upper limit.

The calculating unit 112 calculates the percentage of data of a particular type from among the data assigned to each slice (in the following explanation, the percentage is called the density of a slice). For example, the calculating unit 112 calculates the density of each slice by referring to the assignment information for each slice as output by the assigning unit 111 and the sections-of-interest information output by the extracting unit 102.

Herein, symbols defined as given below are used.

slice[x]: the set of unit videos assigned to the x-th slice

F: the total number of sections of interest included in the sections-of-interest information focus[i]: the set of unit videos of the i-th section of interest included in the sections-of-interest information density[x]: the density of the x-th slice The operation of calculating the density of the x-th slice can be written in the form of a pseudo-program as given below. The following sequence of operations can be performed for each of $\{x|0\leq x<S\}$.

given x
for i=0 to F−1:
count=count+|slice[x]∩focus[i]|
end for
density[x]=count/|slice[x]|

The display control unit 113 controls the display of the seek bar. For example, according to the density of each slice (i.e., according to the number of sets of data of a particular type included in the assigned data), the display control unit 113 displays the slices in mutually different display formats.

Given below is the explanation of an example of a display operation for displaying the slices in the case of using a coloration table. The display control unit 113 searches the coloration table with the density of each slice as the search key, and decides the color (an example of the display format) corresponding to each density. Then, the display control unit 113 displays each slice with the decided color.

However, the display format is not limited to the colors in the slices. Alternatively, for example, the configuration can be such that icons or text labels that are displayed corresponding to the slices are varied according to the density of the slices. Still alternatively, the height of the slices, the color of the frame border of the slices, the thickness of the frame border of the slices, or the type of the frame border of the slices can be varied. Still alternatively, the hatching inside the slices, the degree of transparency of colors, or the blinking pattern (the blinking interval) in the case of blinking display can be varied.

Meanwhile, the display control unit 113 can further have a function of displaying position information (such as a cursor or a marker), which indicates the current reproduction position of the video, on the seek bar. For example, when reproduction, fast-forwarding, or rewinding of the video is being performed by the reproduction control unit 103, the display control unit 113 redraws the cursor based on the information on the current reproduction position as sent constantly by the reproduction control unit 103. Moreover, when a seek instruction with respect to a particular position is issued by the searching unit 104, the display control unit 113 redraws the cursor so as to indicate the particular position. When the zooming scale of the seek bar is varied by the zooming control unit 105, the display control unit 113 redraws the cursor based on the shift in the screen occurring due to zooming.

Moreover, the display control unit 113 can further have a function of displaying information indicating the range of the data that is assigned to the display area of the seek bar. For example, the display control unit 113 displays, below the left end and below the right end of the seek bar, information indicating the start position and the end position of the video displayed by the entire seek bar (i.e., the displayed video). The information indicating the start position and the end position represents, for example, the percentage when the entire video is treated as 100%. That enables the user to understand the status of zooming.

When a zoom-in operation is not performed, the start position is 0% and the end position is 100%. When the zooming control unit 105 performs a zoom-in operation, the values indicating the start position and the end position change under the following constraint condition.

0%≤value of start position<value of end position≤100%

Meanwhile, the display format for the range is not limited to the percentage format. Alternatively, the range can be displayed in the format of time from the start of the video.

Figure 11:
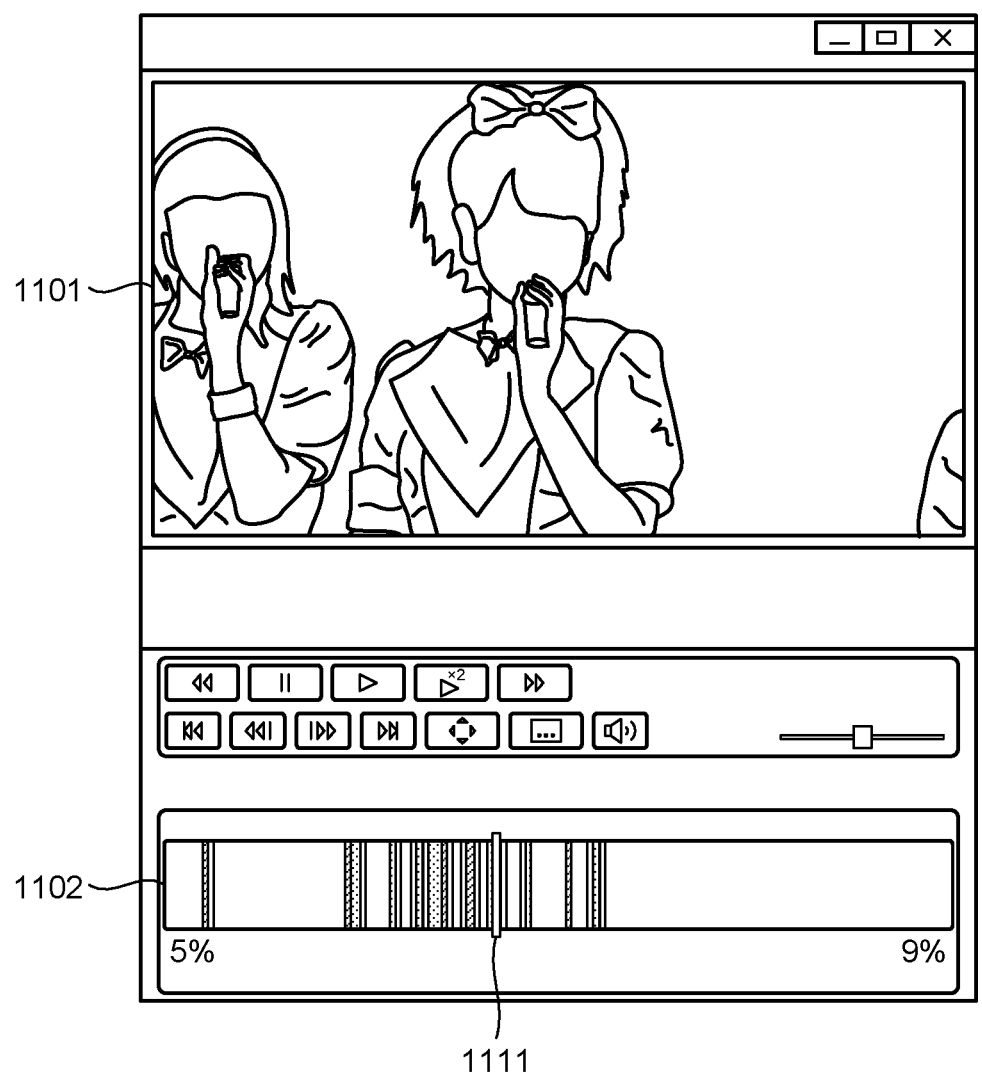
FIG. 11 is a diagram illustrating an exemplary display of a seek bar.

FIG. 11 is a diagram illustrating an exemplary display of the seek bar. In FIG. 11 is illustrated an example that includes a display screen 1101 of the video displayed by the reproduction control unit 103 and includes a seek bar 1102 displayed by the display control unit 113. Moreover, in the example illustrated in FIG. 11, the display is done by varying the hatching of the slices. A cursor 1111 is displayed using vertical lines having a display format (for example, yellow color) that is easily distinguishable from the slices.

The reproduction control unit 103 updates the reproduction position in response to the reproduction of a video, and sends information indicating the current reproduction position to the display control unit 113. Then, the display control unit 113 refers to the received information and accordingly displays the cursor 1111 on the seek bar 1102. For example, accompanying the reproduction of the video, the cursor 1111 moves from the left side to the right side of the seek bar.

Meanwhile, the seek bar 1102 is not limited to have a horizontally-elongated shape as illustrated in FIG. 11, and can alternatively have any shape. For example, the seek bar can be set to have a vertically-elongated shape, and the reproduction of a video can advance from top in the downward direction (or from bottom in the upward direction). Still alternatively, the seek bar can be configured to have a curved shape, a circular shape, or a toroidal shape.

Meanwhile, the abovementioned constituent elements (the obtaining unit 101, the extracting unit 102, the reproduction control unit 103, the searching unit 104, the zooming control unit 105, the calculating unit 112, and the display control unit 113) can be implemented by making one or more processor such as a central processing unit (CPU) to execute computer programs, that is, can be implemented using software; or can be implemented using hardware such as one or more integrated circuit (IC); or can be implemented using a combination of software and hardware.

Figure 12:
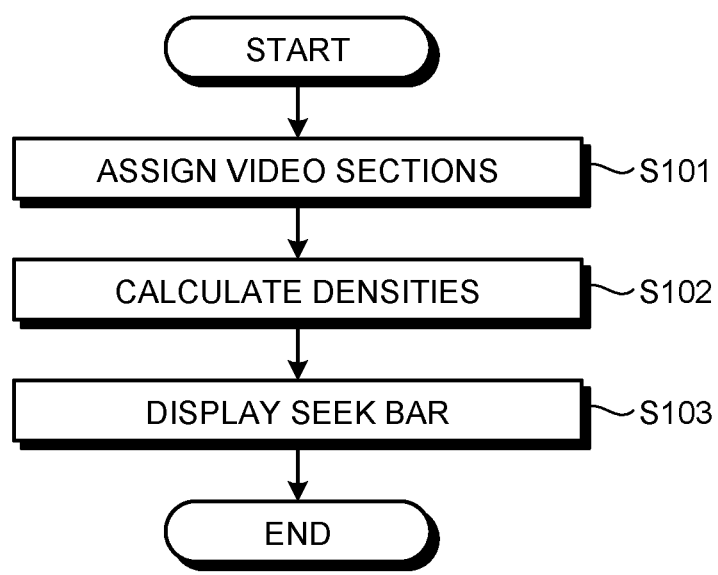
FIG. 12 is a flowchart for explaining an example of a display control operation according to the embodiment.

Explained below with reference to FIG. 12 is a display control operation performed in the display control device 100 configured in the abovementioned manner according to the embodiment. FIG. 12 is a flowchart for explaining an example of the display control operation according to the embodiment. The display control operation is performed, for example, before the start of reproduction of an entire video, after the start of reproduction, and at the time of updating the display in response to zooming.

Firstly, the assigning unit 111 assigns a video section to each slice (Step S101). When a zoom operation has not been performed, the assigning unit 111 decides the video section to be assigned to each slide according to Equation (3) or Equation (4), for example. When a zoom operation is performed, the assigning unit 111 decides the video section to be assigned to each slide according to Equation (5) or Equation (6), for example.

Then, the calculating unit 112 calculates the density of each slice by referring to the information about the video sections assigned to each slice (i.e., assignment information) and the sections-of-interest information (Step S102). For example, the calculating unit 112 performs a density calculation operation expressed earlier in the pseudo-program and calculates the density (density[x]) of each slice. The details of the density calculation operation are given later.

Subsequently, the display control unit 113 refers to the calculated densities and displays the seek bar with varied display formats of the slices (Step S103). The details of a seek bar display operation are given later.

Figure 13:
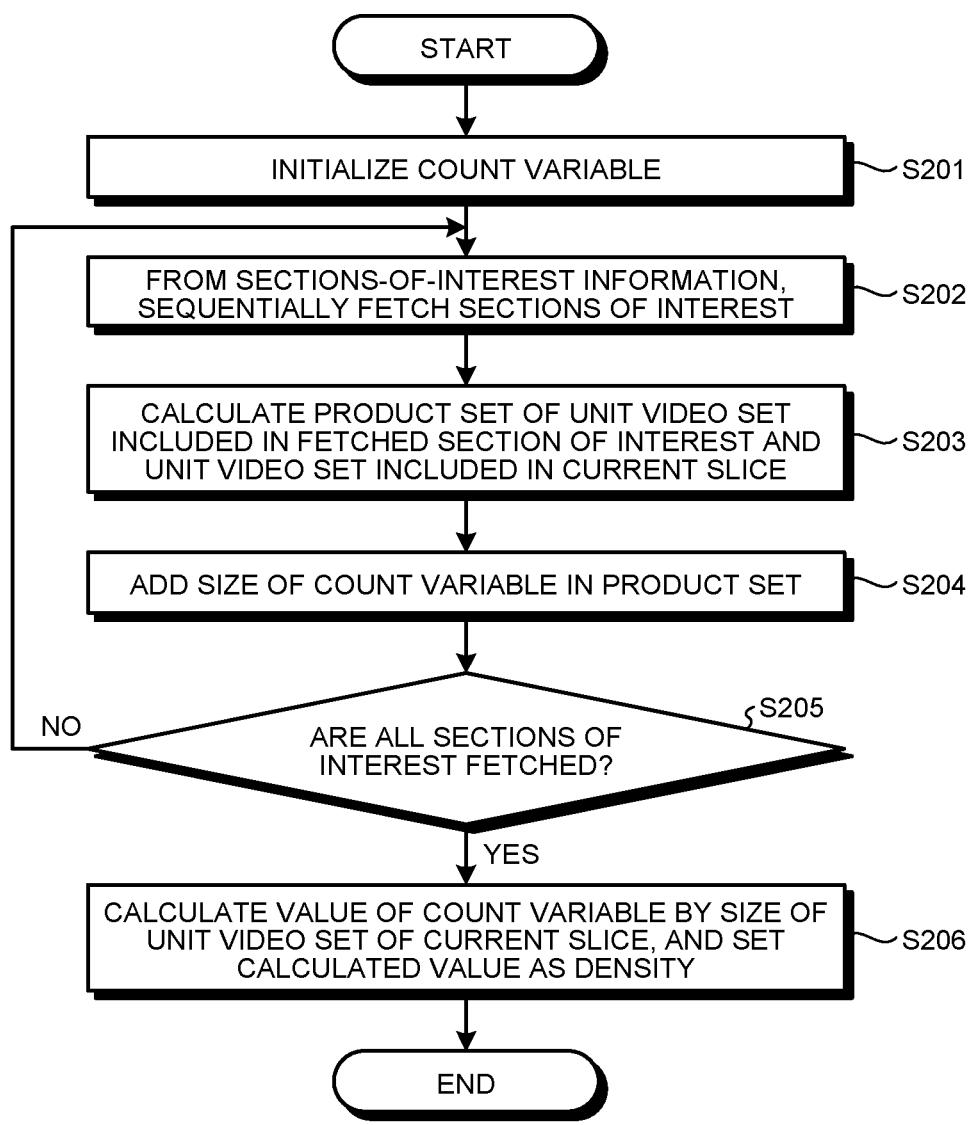
FIG. 13 is a flowchart for explaining an exemplary flow of a density calculation operation.

Given below is the detailed explanation of the density calculation operation performed at Step S102. FIG. 13 is a flowchart for explaining an exemplary flow of the density calculation operation. In the following explanation, the x-th slice is sometimes called the current slice.

The calculating unit initializes a count variable to an initial value (for example, zero) (Step S201). Then, the calculating unit 112 sequentially fetches one section of interest at a time from the sections-of-interest information (Step S202). Subsequently, the calculating unit 112 calculates the product set of the unit video set included in the fetched section of interest and the unit video set included in the current slice (Step S203). Then, the calculating unit 112 adds the size of the product set in the count variable (Step S204). Subsequently, the calculating unit 112 determines whether or not all sections of interest have been fetched (Step S205). If all sections of interest are not yet fetched (No at Step S205), then the system control returns to Step S202 and the operations are repeated. When all sections of interest are fetched (Yes at Step S205), the calculating unit 112 divides the value of the count variable by the size of the unit video set of the current slice, and sets the calculated value as the density (Step S206).

Figure 14:
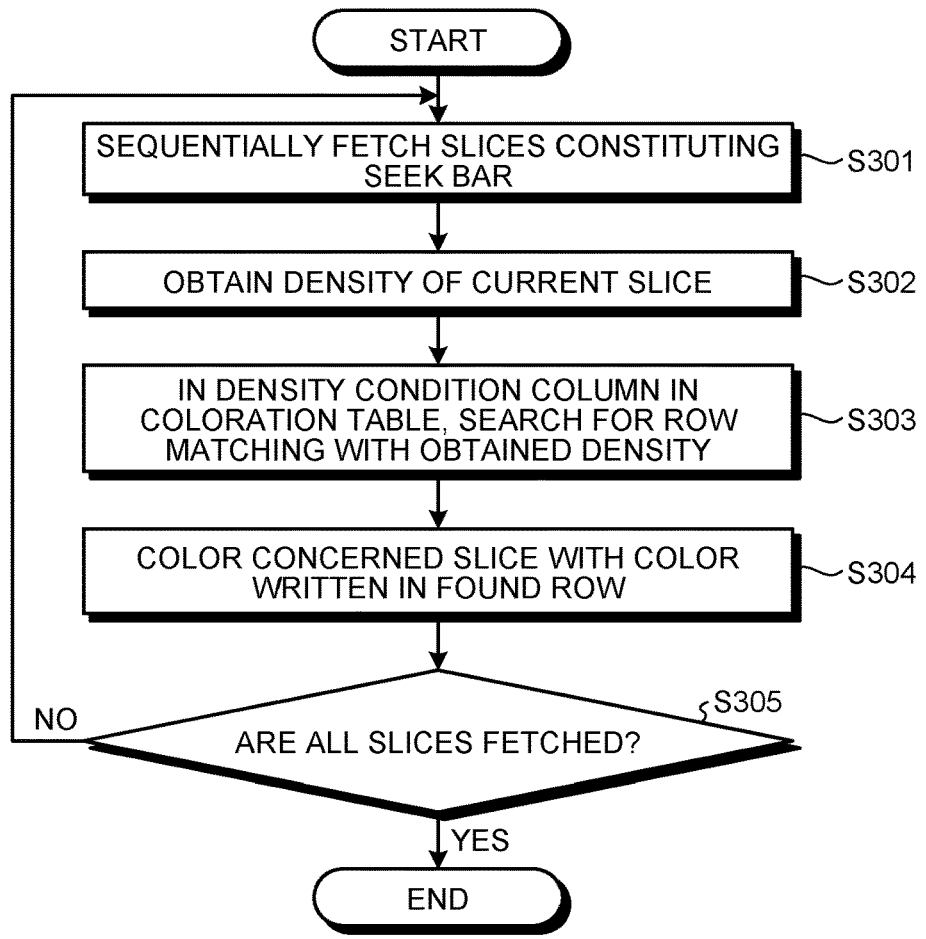
FIG. 14 is a flowchart for explaining an exemplary flow of a seek bar display operation.

Given below is the detailed explanation of the seek bar display operation performed at Step S103. FIG. 14 is a flowchart for explaining an exemplary flow of the seek bar display operation.

The display control unit 113 fetches a slice constituting the seek bar (Step S301). Then, the display control unit 113 obtains the density of the fetched slice (Step S302). Subsequently, in the density condition column in the coloration table, the display control unit 113 searches for the row matching with the obtained density (Step S303). Then, the display control unit 113 colors the concerned slice with the color written in the found row (Step S304). Subsequently, the display control unit 113 determines whether or not all slices have been fetched (Step S305). If all slices are not yet fetched (No at Step S305), the system control returns to Step S301 and the operations are repeated. When all slices are fetched (Yes at Step S305), it marks the end of the seek bar display operation.

Given below is the explanation of a specific example of the method for designing the coloration table. As explained with reference to FIGS. 2 to 4, the coloration table is used to store the density conditions in a corresponding manner to the colors. The density conditions are designed in such a way that, when an OR operation is performed with respect to the density condition written in each row, all densities from zero to one are covered. In FIGS. 2 to 4 are illustrated examples in which color-coding is performed in two colors, three colors, and six colors, respectively, while satisfying the condition mentioned above.

In FIG. 2 is illustrated an example of coloring done to enable distinction between two values indicating whether or not the section is a section of interest. In FIG. 2, it is illustrated that a section of no interest (d=0) is colored black, while a section of interest (0<d≤1) is colored red. In this example, of the one or more unit video groups associated with each slice, if any unit video is equivalent to a section of interest, then the coloring is done with red color. That enables the user to confirm whether or not any section of interest is present at the position of each slice.

Assume that the sections colored with red color include a section that is not of interest (a section of no interest). If the zoom-in operation is performed for an appropriate number of times in the sections colored with red color, the section of no interest gets displayed in black color. That enables the user to confirm any deficit in the sections of interest. However, in the example illustrated in FIG. 2, the information about which portion of the red sections should be zoomed in to find a deficit is not provided to the user.

In FIG. 3 is illustrated an example of coloring done to enable distinction between three types regarding each slice, namely, whether the slice is allotted 100% with sections of interest (red), or whether no section of interest is included in the slice (black), or the other case (whether sections or interest and sections of no interest are mixed) (an intermediate color). When the user is searching for a section of interest, he or she can instantly determine, without having to perform a zoom operation, that a section drawn with black color is "not relevant" and a section drawn with red color is "relevant".

A section drawn with an intermediate color indicates that sections of interest and sections of no interest are mixed. Thus, the user may perform a zoom operation only when the sections of interest in that section are to be made clear. In this way, in the method of color-coding using three colors, the load on the user for performing zoom operations can be reduced.

Figure 15:
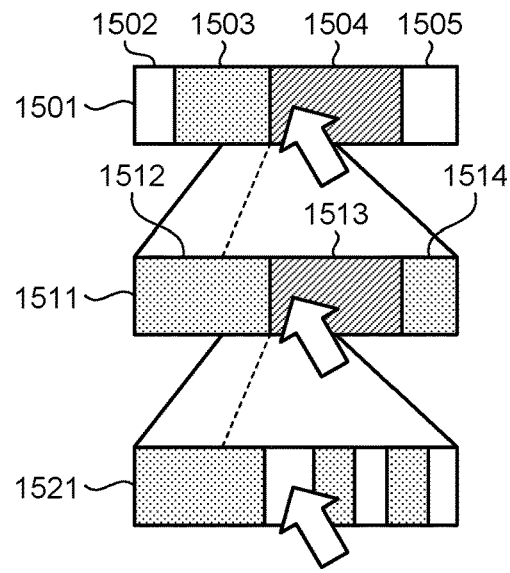
FIG. 15 is a diagram illustrating an exemplary zoom operation in the case of implementing a method for color coding using three colors.

FIG. 15 is a diagram illustrating an exemplary zoom operation in the case of implementing the method for color coding using three colors. A seek bar 1501 is an example of the seek bar prior to a zoom operation. In the seek bar 1501, it is assumed that sections 1502 and 1505 are sections of no interest; a section 1503 is a section of interest; and a section 1504 has ambiguity about whether it is a section of interest or a section of no interest. When the user performs a zoom-in operation by placing the mouse cursor (arrow) on the section 1504, a certain range centered on the position of the mouse cursor is displayed in a magnified manner as the new displayed video.

A seek bar 1511 represents an example of the seek bar after a zoom-in operation has been performed. The solid lines and the dotted lines indicate correspondence between the sections prior to the zoom-in operation and the sections after the zoom-in operation. As a result of performing the zoom-in operation, it becomes clear that a section 1513 on which the mouse cursor is placed has a mix of sections of interest and sections of no interest, and that neighboring sections 1512 and 1514 are allotted with sections of interest. If the user further performs a zoom-in operation in the section 1513, a certain range centered on the position of the mouse cursor is displayed in a magnified manner as the new displayed video.

A seek bar 1521 represents an example of the seek bar after the zoom-in operation. Herein, the seek bar 1521 represents an example in which, as a result performing the zoom-in operation, all sections are either only the sections of interest or only the sections of no interest. In this way, if the zoom operation is repeatedly performed by keeping the position of the mouse cursor fixed, it becomes possible to determine whether that position is in a section of interest or in a section of no interest.

Given below is the further explanation about a specific example of the method for designing the coloration table. In FIG. 4 is illustrated an example in which, in addition to the color-coding indicating whether a slice is allotted 100% with sections of interest (red) or whether no section of interest is included in the slice (black), color-coding for the other portion (a mix of sections of interest and sections of no interest) is done in multiple levels according to the magnitude of the density. In that case, not only it becomes possible to instantly determine whether or not a zoom-in operation is required, as explained with reference to FIG. 3; but it also becomes possible to predict the expected probability of obtaining sections of interest. As a result, as compared to the design illustrated in FIG. 3, the load on the user for performing zoom operations can be further reduced.

Meanwhile, as a twist added to the coloring design illustrated in FIG. 4, the color difference with intermediate colors is increased for the densities zero and one. As explained earlier, the density zero (sections of no interest) and the density one (sections of interest) have special significance as clues in determining whether or not a zoom operation is required. For that reason, when the densities zero and one are expressed in a conspicuous manner on the screen, it becomes possible to enhance the user-friendliness.

In the examples given above, only the color component R is used. Alternatively, color assignment can be done using all color components of RGB. Still alternatively, instead of using the RGB color space, it is possible to use a different color space such as the HSV color space. Meanwhile, although the value of R is provided to have a positive correlation with the density, it is not mandatory to assign the value of R in that manner.

When a zoom-in operation described above is made possible, there occurs a possibility that the cursor indicating the reproduction position of the video deviates from the display range in response to reproduction, fast-forwarding, or rewinding of the video in the zoomed state. In order to avoid the deviation of the cursor from the display range, a function enabling dynamic scrolling of the displayed video or the cursor (i.e., an automatic scrolling function) can be provided.

For example, when the cursor is redrawn in response to the reproduction of the video and gets placed near the right end or near the left end of the seek bar, the sections of the displayed video are changed and redrawn so as to return the cursor position close to the center.

Figure 16:
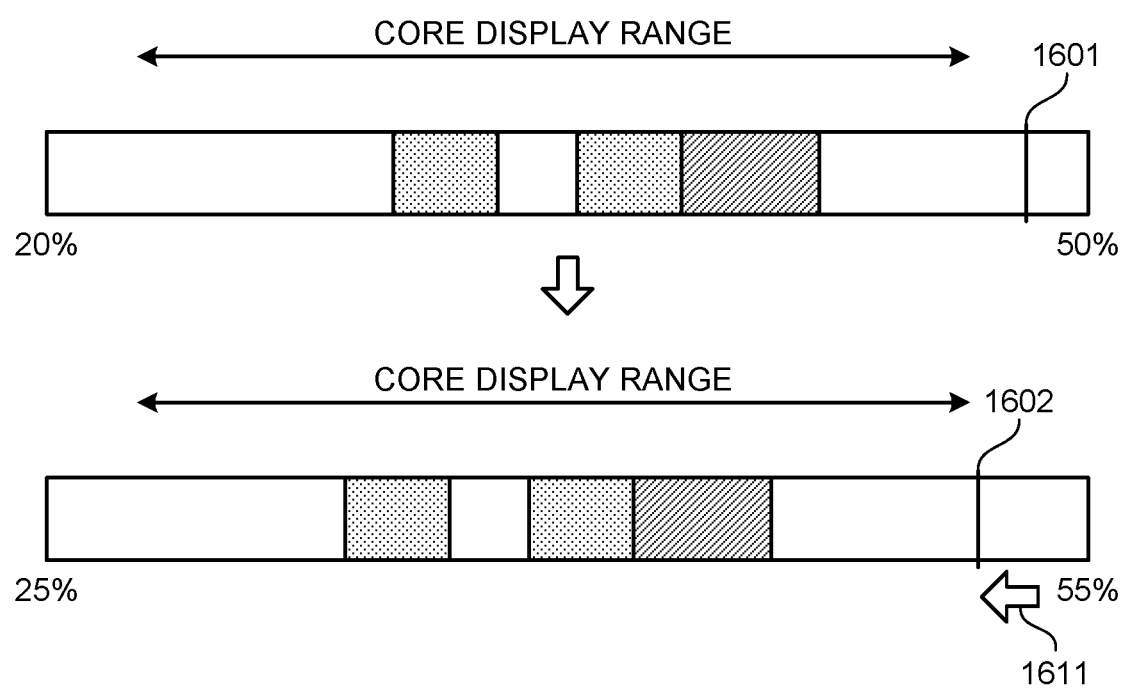
FIG. 16 is a diagram for explaining a specific example of automatic scrolling.

FIG. 16 is a diagram for explaining a specific example of automatic scrolling. Inside the display area, a core display range is assigned. The core display range implies the display range (the allowed area) in which the display of the cursor is allowed. When the reproduction position is varied due to the function such as the reproduction performed by the reproduction control unit 103 and when the display position of the cursor on the screen deviates away from the core display range, the display control unit 113 moves the cursor inside the core display range. Along with that, the entire displayed video is also moved to the left side.

For example, the assigning unit 111 reassigns the data in such a way that the cursor is included in the core display range. The display control unit 113 displays the cursor, which indicates the reproduction position of the post-reassignment data, in the seek bar. In the example illustrated in FIG. 16, a cursor 1601 that deviated from the core display range is moved in the direction of an arrow 1611, and a cursor 1602 is displayed. The range of the displayed video is changed from the range of 20% to 50% to the range of 25% to 55%.

Figure 17:
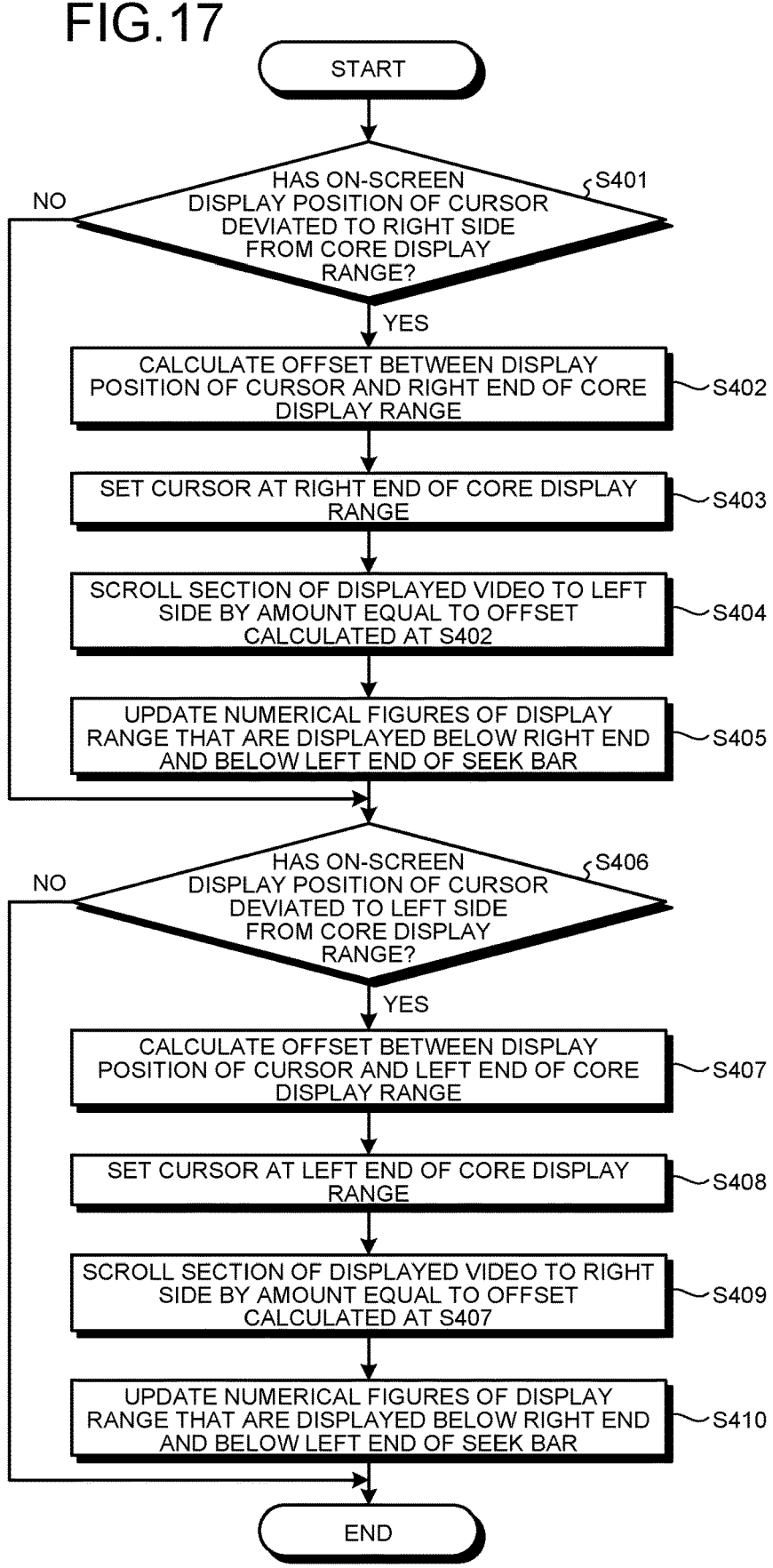
FIG. 17 is a flowchart for explaining an example of an automatic scrolling operation.

FIG. 17 is a flowchart for explaining an example of the automatic scrolling operation.

The display control unit 113 determines whether or not the display position of the cursor has deviated to the right side from the core display range (Step S401). If the display position of the cursor has deviated (Yes at Step S401), then the display control unit 113 calculates the offset between the display position of the cursor and the right end of the core display range (Step S402). Subsequently, the display control unit 113 sets the cursor at the right end of the core display range (Step S403).

With the aim that the sections of the displayed video move to the left side by an amount equal to the offset calculated at Step S402, the assigning unit 111 moves the video section to be assigned to each slice. Then, the display control unit 113 redisplays the post-movement slices (Step S404). Moreover, the display control unit 113 updates the numerical figures of the display range that are displayed below the right end and below the left end of the seek bar (Step S405).

Meanwhile, if it is determined that the display position of the cursor has not deviated to the right side from the core display range (No at Step S401), then the display control unit 113 determines whether or not the display position of the cursor has deviated to the left side from the core display range (Step S406). If the display position of the cursor has deviated (Yes at Step S406), then the display control unit 113 calculates the offset between the display position of the cursor and the left end of the core display range (Step S407). Subsequently, the display control unit 113 sets the cursor at the left end of the core display range (Step S408).

With the aim that the sections of the displayed video move to the right side by an amount equal to the offset calculated at Step S408, the assigning unit 111 moves the video section to be assigned to each slice. Then, the display control unit 113 redisplays the post-movement slices (Step S409). Moreover, the display control unit 113 updates the numerical figures of the display range that are displayed below the right end and below the left end of the seek bar (Step S410).

After the operation at Step S410 is performed or if it is determined that the display position of the cursor has not deviated to the left side from the core display range (No at Step S406), it marks the end of the automatic scrolling operation.

Meanwhile, along with automatic scrolling or instead of automatic scrolling, a function enabling scrolling of the displayed video or the cursor in response to a user operation (i.e., a manual scrolling function) can be provided. In the manual scrolling function, with respect to the seek bar in the zoomed state, when the user issues an instruction for manual scrolling of the sections of the displayed video, the sections are scrolled according to the instruction.

Herein, the operation by which the user instructs scrolling (a scrolling operation) can be any arbitrary operation. For example, a drag-and-drop operation can be set as the scrolling operation. FIG. 18 is a diagram for explaining the manual scrolling function.

The user can perform a drag operation (a dragging start operation) at an arbitrary position on the seek bar. Assume that a drag operation is started at the position of a mouse cursor 1801. Moreover, the user can further move the mouse cursor by a desired movement amount and perform a drop operation (a dragging end operation). Assume that a drop operation is performed at the position of a mouse cursor 1802.

When an instruction to move data is received, the assigning unit 111 reassigns the data that has been moved in response to the instruction. For example, according to the movement amount of a drag-and-drop operation, the assigning unit 111 moves the video section to be assigned to each slice. Then, the display control unit 113 redisplays the post-reassignment video and scrolls the cursor, which indicates the reproduction position, according to the movement amount. Moreover, the display control unit 113 updates the numerical figures of the display range that are displayed below the right end and below the left end of the seek bar.

Consider a case of having to confirm the distribution of the sections of interest in a section far away from the current cursor position. In that case, if the manual scrolling function is not available, it becomes necessary to perform an extremely cumbersome operation in which firstly a zoom-out operation is performed and then a zoom-in operation is performed near the section to be confirmed. However, because of the manual scrolling function, any arbitrary section can be viewed just by performing a drag-and-drop operation while maintaining the zooming scale.

First Modification Example

Given below is the explanation of the application to a multivalued section-displaying seek bar. Herein, a multivalued section-displaying seek bar has the function of creating a visualization of a plurality of types of sections of interest in a distinguishable manner on a type-by-type basis. In a multivalued section-displaying seek bar, the slices can be distinguished and displayed in the following manner.

(1) Method for Indicating Type in Remaining Color Space

In the embodiment described above, using the R parameter of the RGB space, the slices are visualized in different display formats according to the densities. In the first modification example, combinations of the remaining parameters G and B of the RGB space are used to assign different colors according to the types of the sections of interest. For example, assume that T1, T2, and T3 represent three types of the sections of interest. In that case, regarding the type T1, the coloration table illustrated in FIG. 2 can be used. Regarding the type T2, a coloration table can be used in which the values of G are varied instead of the values of R illustrated in FIG. 2. Regarding the type T3, a coloration table can be used in which the values of B are varied instead of the values of R illustrated in FIG. 2. Alternatively, a coloration table formed by integrating the three coloration tables can also be used.

(2) Method for Indicating Type Using Auxiliary Information Such as Text Label

In the vicinity of each slice, a text label or an icon is displayed that indicates the types of the sections of interest.

Second Modification Example

Figure 19:
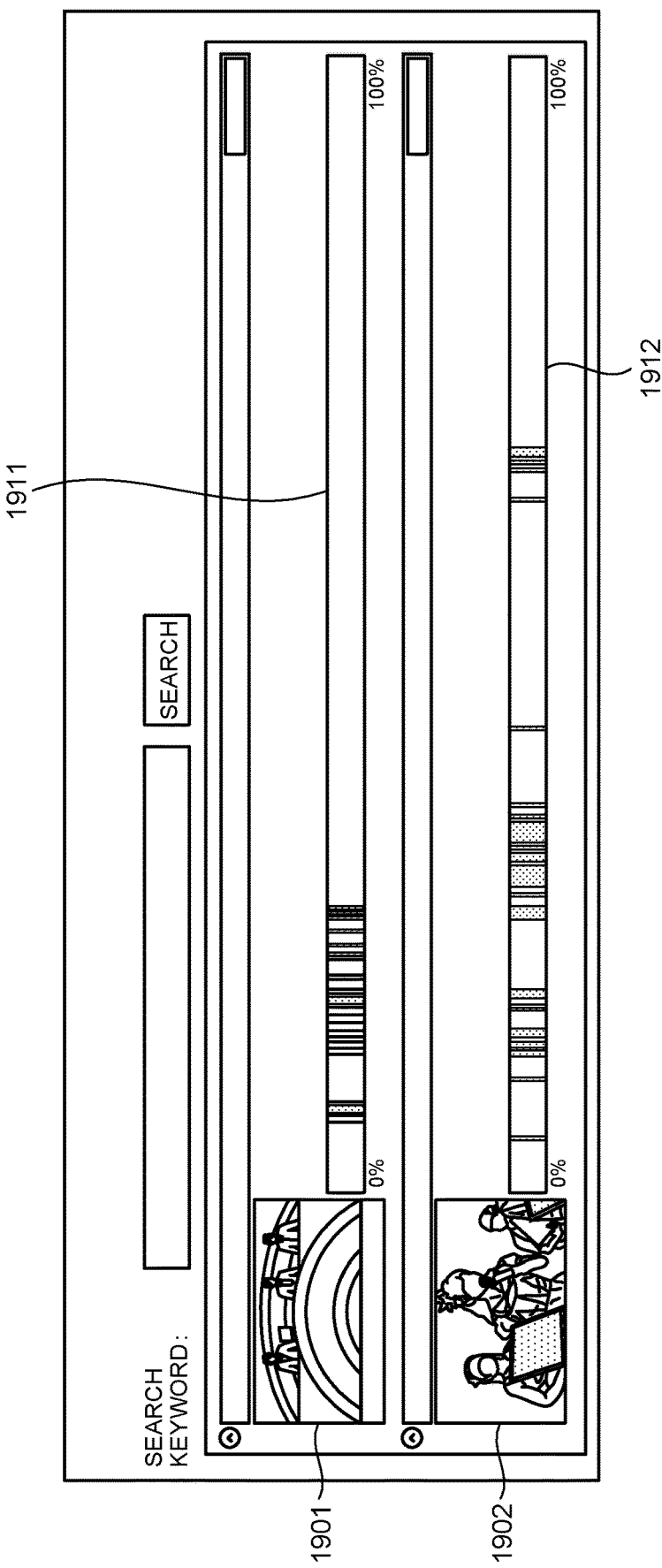
FIG. 19 is a diagram for explaining an example of a case in which the embodiment is applied in a retrieval system.

The embodiment described above can be applied in a retrieval system in which videos are searched based on a search keyword and the search results are arranged based on scores. FIG. 19 is a diagram for explaining an example of the case in which the embodiment is applied in such a retrieval system.

For example, as a result of inputting a search keyword and performing a search, top two videos related to the search keyword are displayed as illustrated in FIG. 19. The reproduction control unit 103 displays videos 1901 and 1902 corresponding to the two search results. The display control unit 113 displays seek bars 1911 and 1912 corresponding to the videos 1901 and 1902, respectively.

The display control unit 113 is provided with the sections related to a search keyword as the sections of interest. For example, if the search keyword is a name of a person, then the section in which the person obtained as the result of face recognition matches with the person identified by the name is provided as the section of interest. In this way, the data of the sections of interest (the data of a particular type) is, for example, an image including such images in the video which are related to the keyword. Herein, either the extracting unit 102 can extract such sections of interest, or the sections of interest extracted in advance can be input.

Based on the video representing the search result and the information on the sections of interest; the assigning unit 111, the calculating unit 112, and the display control unit 113 perform operations identical to the operations explained with reference to FIG. 12 and display the seek bars (the seek bars 1911 and 1912) in such a manner that the sections including the sections of interest are distinguishable from the other sections in the video. The subsequent zoom operation can be performed in an identical manner to the explanation given earlier in the embodiment.

Thus, just by viewing the search result screen and performing zoom operations, the user can easily understand the information given below. That enables achieving reduction in the load of the search task to a large extent.

The approximate number of sections of interest included in each search result item is known. Hence, for example, whether or not that particular video is worthy of opening can be determined to some extent without opening the video.

The manner of distribution in which the sections of interest are included in each search result item is known. Hence, for example, the video configuration, such as the sections of interest appearing only in the first half of the video, can be confirmed without opening the video.

As described above, according to the embodiment, even if the information has granularity exceeding the resolution of the display, it becomes possible to easily understand the distribution of sections of the information. Moreover, as a result of keeping the display scale of information adjustable, each section can be confirmed in a simpler manner.

Figure 20:
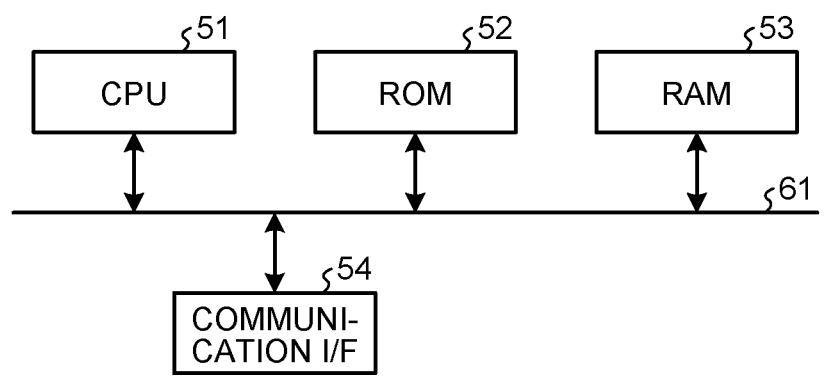
FIG. 20 is an explanatory diagram illustrating an exemplary hardware configuration of the display control device according to the embodiment.

Explained below with reference to FIG. 20 is a hardware configuration of the display control device according to the embodiment. FIG. 20 is an explanatory diagram illustrating an exemplary hardware configuration of the display control device according to the embodiment.

The display control device according to the embodiment includes a control device such as a central processing unit (CPU) 51; memory devices such as a read only memory (ROM) 52 and a random access memory (RAM) 53; a communication interface (I/F) 54 that establishes connection with a network and performs communication; and a bus 61 that connects the constituent elements to each other.

A computer program executed in the display control device according to the embodiment is stored in advance in the ROM 52.

Alternatively, the computer program executed in the display control device according to the embodiment can be recorded as an installable file or an executable file in a computer-readable recording medium such as a compact disk read only memory (CD-ROM), a flexible disk (FD), a CD-R (compact disk recordable), or a digital versatile disk (DVD); and can be provided as a computer program product.

Still alternatively, the computer program executed in the display control device according to the embodiment can be stored in a downloadable manner in a computer connected to a network such as the Internet. Still alternatively, the computer program executed in the display control device according to the embodiment can be distributed over a network such as the Internet.

The computer program executed in the display control device according to the embodiment can make a computer to function as the constituent elements of the display control device. In the computer, the CPU 51 can read the computer program from a computer-readable memory medium into a main memory device and execute the computer program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirits of the inventions.

What is claimed is:

1. A display control device comprising:
 a grouping unit that, with respect to S number of units of display (where S is an integer equal to or greater than two) included in a display area in which the units of display each having a width equal to L number of pixels (where L is an integer equal to or greater than one) are placed in width direction, groups M number of pieces of data (where M is an integer greater than S) in a divided manner; and
 a display control unit that controls display of the units of display in different display formats according to a number of pieces of data of a particular type included in the grouped data, wherein when an instruction for magnification of display is received:
    the grouping unit regroups M' number of the number of pieces of data (where M' is an integer smaller than M) to the S number of units of display in the divided manner,
    the display control unit controls display of the units of display such that:
        the units of display are in different display formats according to the number of pieces of data of the particular type included in the reassigned data, and
        the display control unit displays, in mutually different display formats:
            first-type units of display in which all of the grouped data is of the particular type,
            second-type units of display in which none of the grouped data is of the particular type, and
            third-type units of display in which the grouped data comprises a mix of both data of the particular type and data not of the particular type.

2. The display control device according to claim 1, wherein the display control unit further controls display of the units of display such that the units of display are in additional display formats according to a range of the data grouped in the units of display.

3. The display control device according to claim 1, further comprising a calculating unit that calculates a percentage of data of the particular type from among data grouped to the units of display, wherein
    the display control unit controls display of the third-type units of display in a different display format according to the calculated percentage.

4. The display control device according to claim 1, wherein the display control unit controls display of the units of display in different colors according to the number of pieces of data of the particular type included in the grouped data.

5. The display control device according to claim 1, further comprising a reproduction control unit that at least has function of reproducing data, wherein
    the display control unit further controls display of position information, which indicates reproduction position, in the display area.

6. The display control device according to claim 5, wherein
    when the position information is outside an allowed area within the display area, the grouping unit regroups data in such a way that the position information is included in the allowed area, and
    the display control unit further controls display of position information, which indicates reproduction position of post-regrouped data, in the display area.

7. The display control device according to claim 1, wherein when an instruction for moving data to be grouped is received:
    the grouping unit regroups data that has been moved in response to the instruction, and
    the display control unit controls display of the units of display after data regrouping in different formats according to the number of pieces of data of the particular type included in the grouped data.

8. The display control device according to claim 1, wherein M number of pieces of data represents a video including M number of images or represents a sequence of continuous M number of images.

9. The display control device according to claim 8, wherein data of the particular type represents images including images related to a keyword from among the M number of images.

10. A display control method comprising:
    grouping with respect to S number of units of display (where S is an integer equal to or greater than two) included in a display area in which the units of display each having a width equal to L number of pixels (where L is an integer equal to or greater than one) are placed in width direction, M number of pieces of data (where M is an integer greater than S) in a divided manner;
    controlling display of the units of display in different display formats according to a number of pieces of data of a particular type included in the grouped data,
    when an instruction for magnification of display is received, regrouping M' number of the number of pieces of data (where M' is an integer smaller than M) to the S number of units of display in the divided manner,
    controlling display of the units of display such that the units of display are in different display formats according to the number of pieces of data of the particular type included in the regrouped data,
    displaying, in mutually different display formats:
        first-type units of display in which all of the grouped data is of the particular type,
        second-type units of display in which none of the grouped data is of the particular type, and
        third-type units of display in which the grouped data comprises a mix of both data of the particular type and data not of the particular type.

11. A computer program product having a non-transitory computer readable medium including programmed instructions, wherein the instructions, when executed by a computer, cause the computer to perform:
    grouping, with respect to S number of units of display (where S is an integer equal to or greater than two) included in a display area in which the units of display each having a width equal to L number of pixels (where L is an integer equal to or greater than one) are placed in width direction, groups M number of pieces of data (where M is an integer greater than S) in a divided manner;
    controlling display of the units of display in different display formats according to the number of pieces of data of a particular type included in the grouped data,
    when an instruction for magnification of display is received, resigning regrouping M' number of pieces of data (where M' is an integer smaller than M) to the S number of units of display in the divided manner,
    controlling display of the units of display such that the units of display are in different display formats according to the number of pieces of data of the particular type included in the regrouped data, and
    displaying, in mutually different display formats:
        first-type units of display in which all grouped data is of the particular type,
        second-type units of display in which none of the grouped data is of the particular type, and
        third-type units of display in which the grouped data comprises a mix of both data of the particular type and data not of the particular type.

\* \* \* \* \*